(12) United States Patent  
Vodzak et al.

(10) Patent No.: US 6,238,089 B1
(45) Date of Patent: *May 29, 2001

(54) METHOD AND APPARATUS FOR FLUID SEAL IN AN OPTICAL PROBE TIP

(75) Inventors: John Vodzak, Ballwin, MO (US); John J. Korff, Vista; Gary J. O'Hara, Enscondido, both of CA (US); Frederick F. Schweitzer, Jr., Glencoe; Mark A. Davis, St. Paul, both of MO (US)

(73) Assignee: Sherwood Services AG, Schasshausen (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,611

(22) Filed: Aug. 25, 1998

Related U.S. Application Data

(62) Division of application No. 08/708,327, filed on Sep. 4, 1996, now Pat. No. 5,857,775
(60) Provisional application No. 60/003,240, filed on Sep. 5, 1995.

(51) Int. Cl.[7] .................................................. G01K 1/00
(52) U.S. Cl. ........................... 374/208; 374/130; 374/121
(58) Field of Search .................................. 374/158, 208, 374/209, 130, 121

(56) References Cited

U.S. PATENT DOCUMENTS

| 2,625,573 | 1/1953 | Connell ................................. 374/179 |
| 3,845,661 | 11/1974 | Hollweck et al. .................. 73/343 R |
| 3,923,552 | 12/1975 | Parris ................................... 374/179 |
| 4,417,470 | 11/1983 | McCracken et al. ................... 73/154 |
| 4,481,417 | 11/1984 | Inglee ................................... 374/144 |
| 4,640,627 | 2/1987 | Tracy et al. .......................... 374/121 |
| 4,790,324 | 12/1988 | O'Hara et al. ........................ 374/126 |
| 4,991,976 | 2/1991 | Byles ................................... 374/135 |
| 4,993,419 | 2/1991 | Pompei et al. ........................ 128/664 |
| 5,018,872 | 5/1991 | Suszynski et al. .................... 374/133 |
| 5,152,610 | * 10/1992 | Hallett ................................. 374/156 |
| 5,179,936 | 1/1993 | O'Hara et al. ............................ 128/9 |
| 5,232,228 | 8/1993 | Egawa et al. ......................... 374/123 |
| 5,293,862 | 3/1994 | O'Hara et al. ............................ 128/9 |
| 5,293,877 | 3/1994 | O'Hara et al. ........................ 374/131 |
| 5,323,005 | 6/1994 | Merkel ................................. 374/131 |
| 5,325,863 | 7/1994 | Pompei ................................. 128/736 |
| 5,340,215 | 8/1994 | Makita et al. ........................ 374/121 |
| 5,366,290 | * 11/1994 | Mayer et al. ......................... 374/130 |
| 5,388,707 | 2/1995 | Aoyama et al. ....................... 374/130 |
| 5,425,582 | * 6/1995 | Asano et al. .......................... 374/208 |
| 5,445,158 | 8/1995 | Pompei ................................. 128/664 |
| 5,507,576 | 4/1996 | Fally ................................... 374/131 |
| 5,628,323 | 5/1997 | Pompei ................................. 374/130 |
| 5,720,556 | * 2/1998 | Krellner ............................... 374/185 |

FOREIGN PATENT DOCUMENTS

| 0641131 | 8/1950 | (GB) ..................................... 374/130 |
| 0744914 | 2/1956 | (GB) ..................................... 374/130 |

\* cited by examiner

*Primary Examiner*—Diego Gutierrez
*Assistant Examiner*—Lydia M. De Jesús
(74) *Attorney, Agent, or Firm*—Mark S. Leonardo; Peter B. Sorell; Brown Rudnick Freed & Gesmer

(57) ABSTRACT

A probe tip in combination with a seal assembly that prevents debris and other contaminants from entering the probe tip. In the preferred embodiment, the seal comprises a tube with a filter holder assembly attached at the distal end of the holder. The filter holder assembly includes an infrared filter seated inside a screw-on member that is attached to a holder member with a sealing member located directly behind the infrared filter. During manufacturing, a predetermined force is applied to the proximal end of the tube which drives the distal end of the tube and filter holder assembly against the probe tip opening, thereby forming a watertight seal thereto. In alternative embodiments, the seal assembly may be comprised of a collar and gasket combination instead of a filter holder assembly.

14 Claims, 9 Drawing Sheets

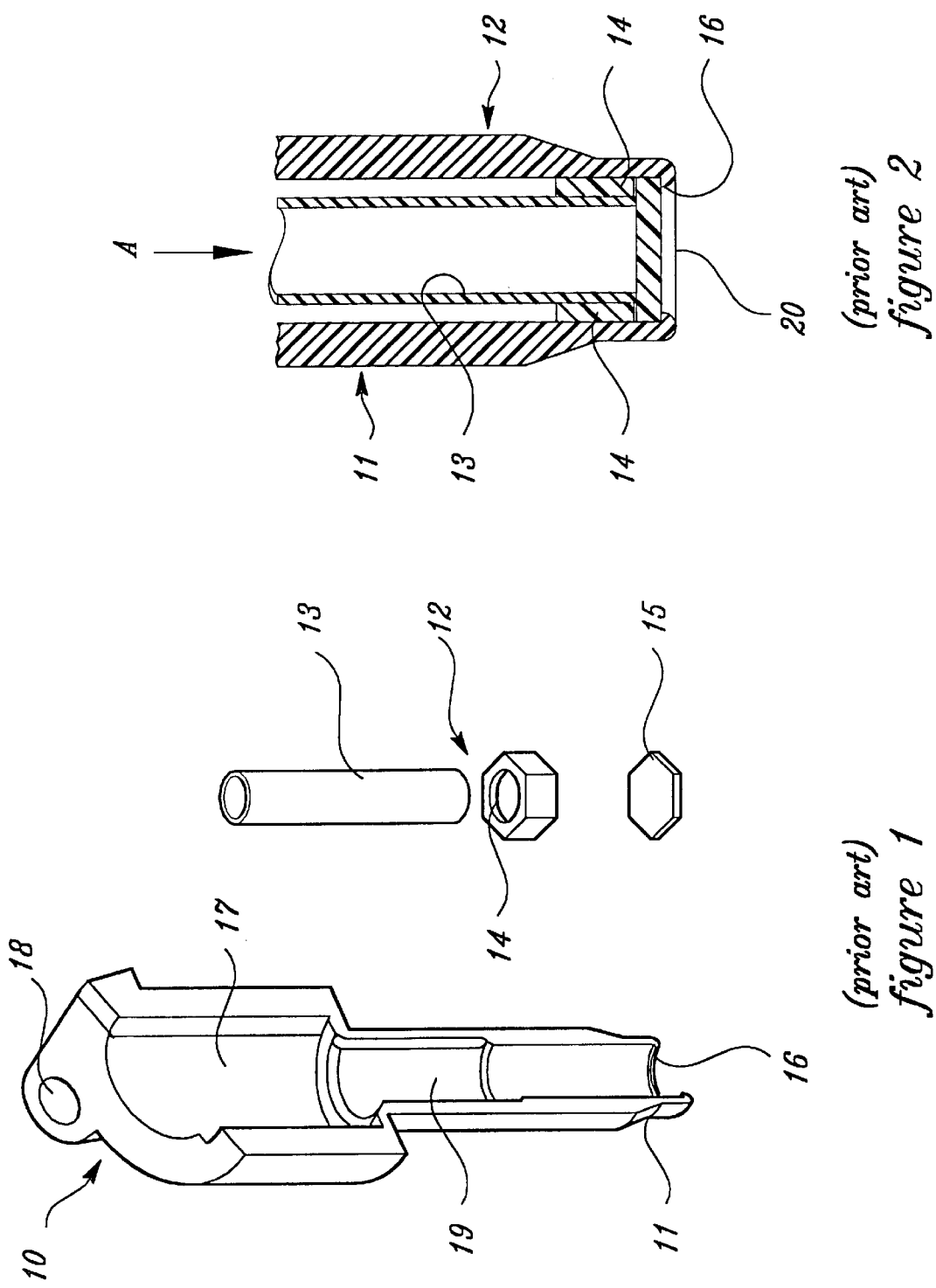

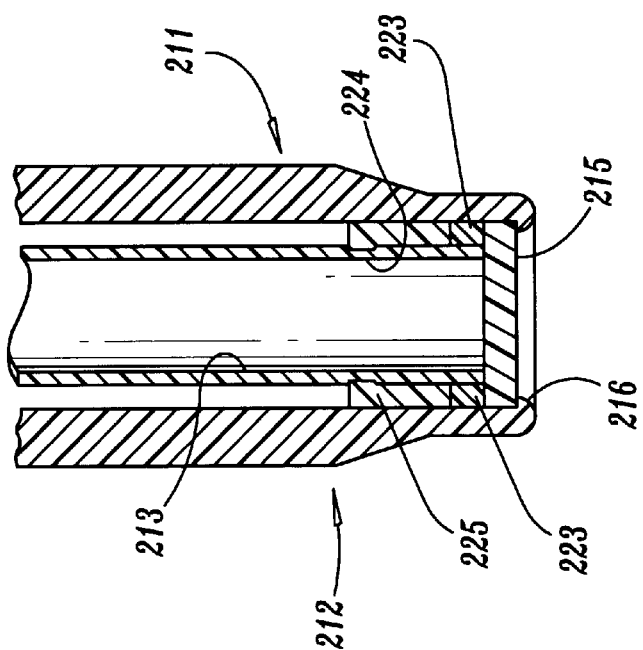
FIG. 6
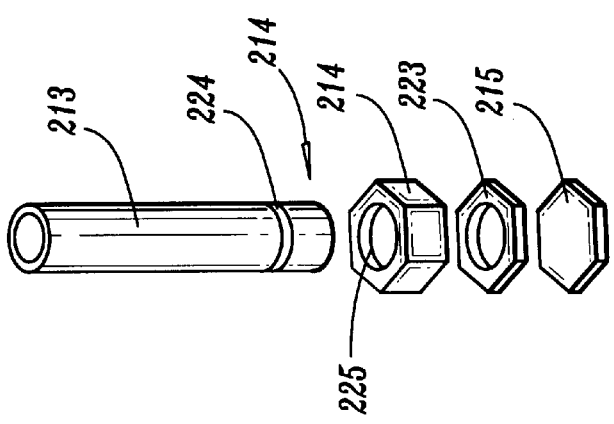
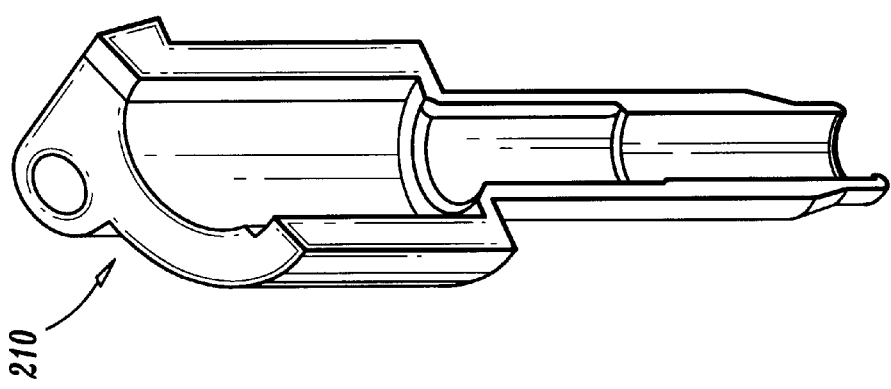
FIG. 5

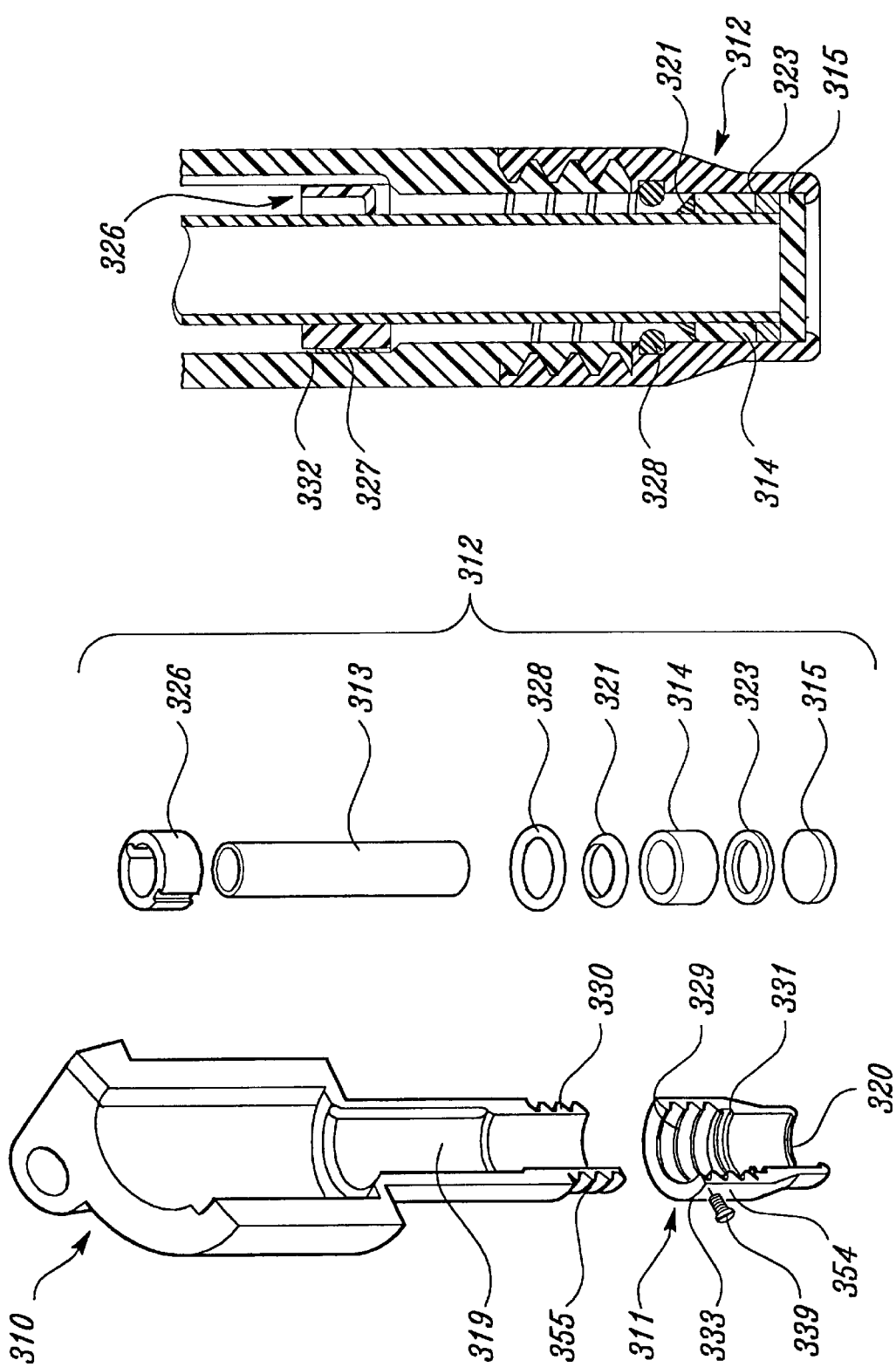

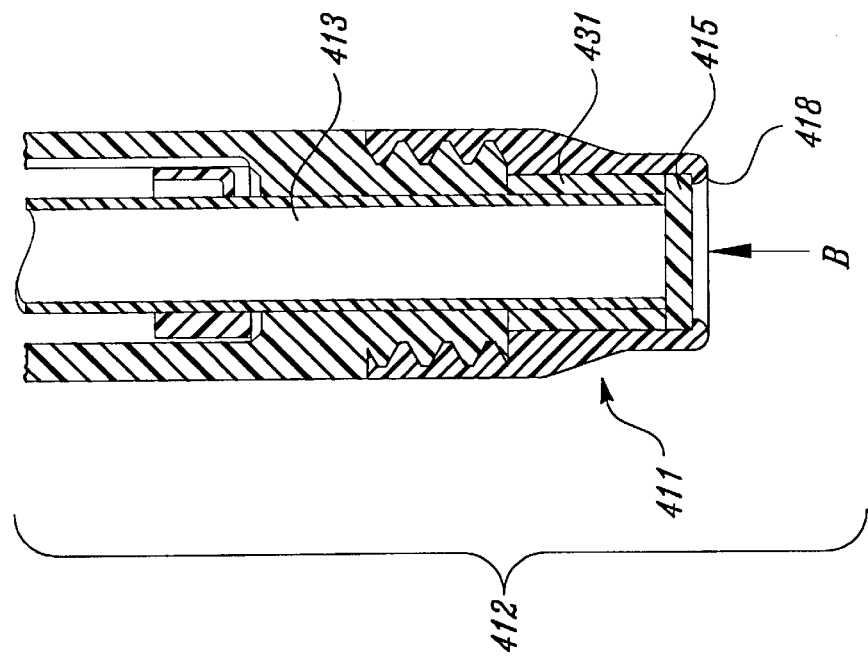
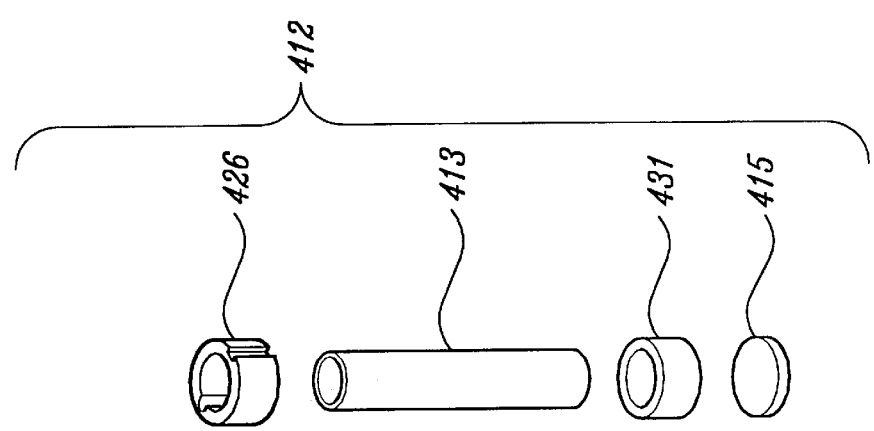
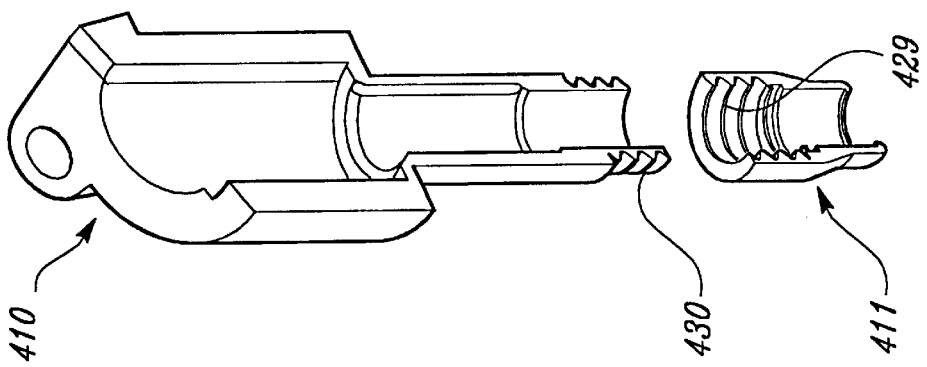

METHOD AND APPARATUS FOR FLUID SEAL IN AN OPTICAL PROBE TIP

CROSS-REFERENCE TO RELATED APPLICATIONS

This application claims benefit to U.S. provisional application Ser. No. 60/003,240, filed Sep. 5, 1995, which is a divisional application of U.S. Ser. No. 08/708,327, filed Sep. 4, 1996 now U.S. Pat. No. 5,857,775.

FIELD OF THE INVENTION

This invention relates generally to a probe tip for electronic thermometers. More specifically, the present invention relates to a removable titanium probe tip for tympanic thermometers. Even more specifically, the present invention relates to a removable titanium probe tip for tympanic thermometers that includes a watertight seal and related method of construction thereof.

PRIOR ART

The diagnosis and treatment of many body ailments depends upon an accurate reading of the internal or core temperature of a patient's body, and in some instances, upon a comparison to a previous body temperature reading. For many years, the most common way of taking a patient's temperature involved utilization of Mercury thermometers. However, such thermometers are susceptible to breaking and must be inserted and maintained in the rectum or mouth for several minutes, often causing discomfort to the patient.

Because of the drawbacks of conventional Mercury thermometers, electronic thermometers were developed and are now in widespread use. Typically, such electronic thermometers have a probe connected by wires to a remote unit containing electronic circuitry. The probe is sheathed in a protective, disposable cover before being inserted into a patient's mouth or rectum. Using predictive techniques, the patient's temperature reading is taken in a significantly shorter time period, for example thirty seconds, compared to several minutes required for conventional Mercury thermometers. Also, the electronic thermometers in some instances provide more accurate temperature readings than Mercury thermometers.

Although electronic thermometers provide relatively more accurate temperature readings than Mercury thermometers, they nevertheless share many of the same drawbacks. For example, even though electronic thermometers provide faster readings, a half minute must still pass before an accurate reading can be taken. Finally, electronic thermometers must still be inserted into the patient's mouth or rectum.

Tympanic thermometers provide nearly instantaneous and accurate reading of core temperature without the undue delay attendant with other thermometers. The tympanic membrane is generally considered by the medical community to be superior to oral, rectal or axillary sites for taking a patient's temperature. This is because the tympanic membrane is more representative of the body's internal or core temperature and more responsive to changes in core temperature. Tympanic thermometers, those thermometers that sense the infrared emissions from the tympanic membrane, offer significant advantages over Mercury or conventional electronic thermometers.

Recent efforts to provide a method and apparatus for measuring body temperature inside the tympanic membrane have produced several excellent tympanic thermometers. For example, U.S. Pat. Nos. 4,602,642 and 4,790,324 to O'Hara et al provide for a tympanic thermometer that measures internal body temperature utilizing the infrared emissions from within the tympanic membrane of the ear, and are herein incorporated by reference in their entirety.

The tympanic thermometer of O'Hara is comprised of a probe unit that has a handle and a probe head body terminating in a probe tip which is inserted into the external ear canal. The handle houses a circuit board that controls the operation of the thermometer and a display that displays temperature readings and other information.

The probe head body is attached to the distal end of the circuit board and houses a seal assembly, optical waveguide tube, infrared filter and thermopile detector. The probe head body further includes a first bore in fluid flow communication with a narrower second bore. The distal end of the first bore forms a tip with an opening thereto for passing infrared emissions from the tympanic membrane into the probe head body. The infrared filter is mounted in the opening and filters unwanted emissions while the optical waveguide tube conducts the infrared emissions to the thermopile detector located at the proximal end of the tube. In order to prevent contamination from entering the probe head body, a seal assembly is also provided that furnishes a watertight barrier against liquid and debris from entering through the interface between the probe tip and the infrared filter.

Before the thermometer is inserted, the metal thermopile located inside the first bore is heated to a predetermined precise temperature by resistors which are energized and controlled through the circuit board. By heating the thermopile, the thermopile is thereby calibrated to a temperature near the core body temperature and higher reading accuracy is attained. The user then operates the thermometer by inserting the probe tip into the patient's ear canal and depressing the SCAN switch once the probe tip is properly seated inside the ear canal. At this point, infrared emissions from the tympanic membrane are filtered through the infrared filter and conducted by the optical waveguide tube until detected by the thermopile detector. Actuating the SCAN switch also alerts the microcomputer that the tympanic algorithm should commence. Once the microcomputer is alerted, it starts acquiring the thermopile output level at a rate of approximately seven times per second and stores and the maximum reading.

The accuracy of any temperature reading taken by a tympanic thermometer depends a lot on preventing liquid and debris from entering the probe head body and contaminating the optical waveguide tube, thereby requiring recalibration of the tympanic thermometer. Accordingly, a seal is required in order to seal off parts of the probe head body susceptible to entry by contaminants.

U.S. Pat. No. 5,293,877 ('877 patent) to O'Hara et al discloses a probe that includes a seal for preventing fluid and debris from contaminating the probe's front end. The probe seal recited in the '877 patent relies on the mechanical fit between the tube, IR filter and the probe tip to provide a dust-proof seal. The seal functions to isolate the probe from contaminants that might enter through the probe tip by seating the infrared filter against the lip of the probe tip opening and utilizing the tube stabilizer located at the distal end of the tube to press against the IR filter, thereby creating a seal about the probe head body. During manufacturing, the seal is formed by applying a predetermined compressive force to the proximal end of tube which compresses the tube against the IR filter seated against the probe tip opening, thereby sealing off the probe head body from dust or other contaminants.

However, the seal configuration and the probe tip of the '877 patent has several drawbacks. One drawback is that mating surfaces of the tube, IR filter and probe tip cannot be manufactured perfectly flat, therefore fluid is able to seep through these interfaces and possibly compromise the watertight integrity of the probe head body whenever the thermometer is cleaned with fluid cleaners. Another drawback with the '877 patent is that the probe tip, which is integral to the probe head body, is made of hard plastic and is susceptible to deformation when dropped. Such deformation of the tip may change the field of view of the probe and take the device out of calibration, thus requiring the probe head body to be replaced and the thermometer to be recalibrated.

As of yet, nothing in the prior art has addressed the problem of developing a watertight seal, preferably in conjunction with a strengthened removable probe tip that does not suffer from the particular drawbacks cited in the aforementioned system.

Therefore, there exists a need in the medical art for an improved watertight seal configuration for tympanic thermometers probes which can include a removable hardened probe tip if desired.

SUMMARY OF THE INVENTION

In brief summary, the present invention relates to an improved watertight seal for tympanic thermometers and related method of construction thereof which may also include a removable titanium probe tip if desired. In the preferred embodiment, the watertight seal is comprised of a removable probe tip made of titanium that encloses an infrared (IR) filter housed in a novel filter holder assembly which is seated against the lip of the probe tip opening. The filter holder assembly functions as both a housing for the infrared filter and as a part of an improved watertight seal that serves to seal off the front end of the probe head body. The removable probe tip provides a strong and easily replaceable tip while including a sealing member for sealing off the interface between the probe tip and the probe head body. During manufacturing, the seal is assembled by first attaching the filter holder assembly to the optical waveguide tube and connecting the probe tip to the distal end of the waveguide tube by screwing the tip onto the front end of the probe head body. Once the probe tip is connected, the probe head body is attached to the circuit board using a pair of screws or the like. The screws generate a compressive force inside the probe head body when the probe head body is brought into contact with the circuit board, thereby effectively sealing off the front end of the probe head body against fluid access to the body interior. The compressive force maintained inside the probe head body between the filter holder assembly and the other parts of the seal assembly to assist in maintaining the seal.

In one embodiment of the present invention, the seal is comprised of either an integral or removable probe tip that houses an IR filter which is seated against a lip of the probe tip opening. The seal has a tube with a stabilizer collar affixed around the tube at the it's distal end with epoxy. The watertight seal also has a rubber gasket interposed between the stabilizer collar and the IR filter. During the manufacturing process, a compressive force is applied to the proximal end of the tube, thereby pressing the rubber gasket against the IR filter and forming a watertight barrier at the filter/gasket interface near the opening of the probe tip.

In a further embodiment, the seal is used in a probe head body that has an integral probe tip and is comprised of the same seal configuration of the stabilizer collar with the rubber gasket interposed between the IR filter and the collar as described above. However, this particular embodiment removes the need for using an epoxy or like substance to affix the collar to the rod by forming a groove around the rod near its distal end in order to secure an associated nib of the collar to the rod along the groove.

Accordingly, a principle object of the present invention is to provide a watertight seal for the thermometer's optical pathway.

It is the further object of the present invention to provide a hardened probe tip that is removable.

Another object of the present invention is to provide a splash proof seal for the interior of the probe head body that allows the probe tip to be cleaned with liquid solutions without seepage into the probe tip.

A further object of the present invention is to provide a probe tip that forms a part of the seal configuration.

Another important object of the present invention is to provide a method of manufacturing a watertight and splash proof seal for a probe tip thermometer.

These and other objects of the present invention are realized in a presently preferred embodiment thereof, described by way of example and not necessarily by way of limitation, which provides for a probe tip seal having a hardened removable probe tip and related method of manufacturing thereof.

Additional objects, advantages and novel features of the invention will be set forth in the description which follows, and will become apparent to those skilled in the art upon examination of the following more detailed description and drawings in which like elements of the invention are similarly numbered throughout.

BRIEF DESCRIPTION OF THE DRAWINGS

FIG. 1 shows a prior art partial cross section perspective of a probe head body and integral probe tip therefore, with an exploded view of the seal assembly;

FIG. 2 shows a cross section of the prior art probe tip and seal configuration;

FIG. 5 shows a partial cross section perspective view of the probe head body with integral probe tip therefore, with an exploded view of the seal assembly in accordance with a second embodiment of the present invention;

FIG. 6 shows a cross section of the probe tip and seal assembly in accordance with the second embodiment of the present invention;

FIG. 7 shows a partial cross section perspective view of the probe head body with a removable probe tip in combination with an exploded view of the seal in accordance with a third embodiment of the present invention;

FIG. 8 shows a cross section of the removable probe tip and seal assembly in accordance with the third embodiment of the present invention;

FIG. 11 shows a partial cross section perspective view of the probe head body with a removable probe tip therefore, with an exploded view of the seal assembly in accordance with a fourth embodiment of the present invention;

FIG. 12 shows a cross section of the probe tip and seal assembly in accordance the fourth embodiment of the present invention;

DETAILED DESCRIPTION

Figure 4:
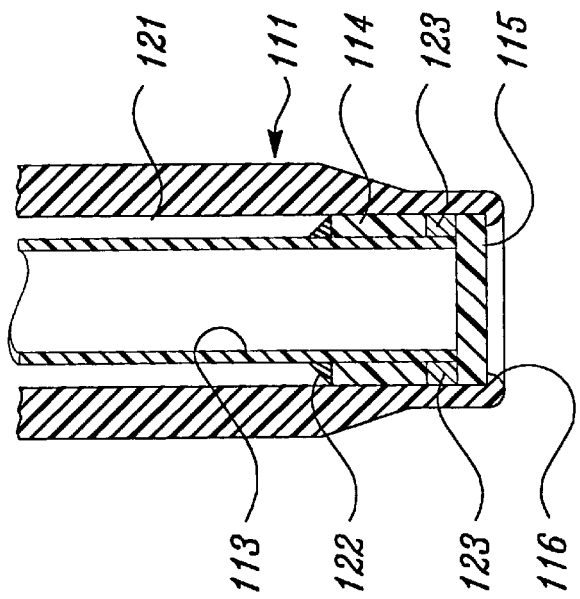
FIG. 4 shows a cross section of the probe tip of FIG. 3, showing the seal assembly in accordance with the present invention.

Referring to FIG. 1, a prior art probe head body 10 including probe tip 11 at its distal end and a mounting hole 18 is shown with an exploded view of a prior art seal assembly 12 encased in the probe head body 10. The prior art seal 12 includes a tube 13 which has a stabilizer collar 14 rotatably secured about the distal end of tube 13 which pushes against an IR filter 15 seated in the lip 16 of the probe tip 11. The probe head body 10 further includes a first bore 17 at the proximal end of the probe head body 10 which is in fluid flow communication with a smaller second bore 19 at the distal end of body 10.

FIG. 2 shows a cross section of the probe tip 11 with including the prior art seal 12 assembly. Seal 12 is formed by applying a predetermined compressive force A to the proximal end of tube 13 during the manufacturing and assembly of the probe head body 11. The compressive force A drives the distal end of tube 13 against the IR filter 15. The stabilizer collar 14, located at the distal end of tube 13, functions to center the distal end of tube 13 in the smaller bore 19 located at the distal end of probe head body 10. The IR filter 15, which is seated in lip 16 of the probe tip 11, forms a seal thereto due to the compressive action of the IR filter 15 against lip 16. The seal 12 thereby prevents fluid and debris from entering the probe tip 11 through the probe tip opening 20 due to the permanent tension between the filter 15 and lip 16 applied during assembly of the probe head body 10.

Figure 3:
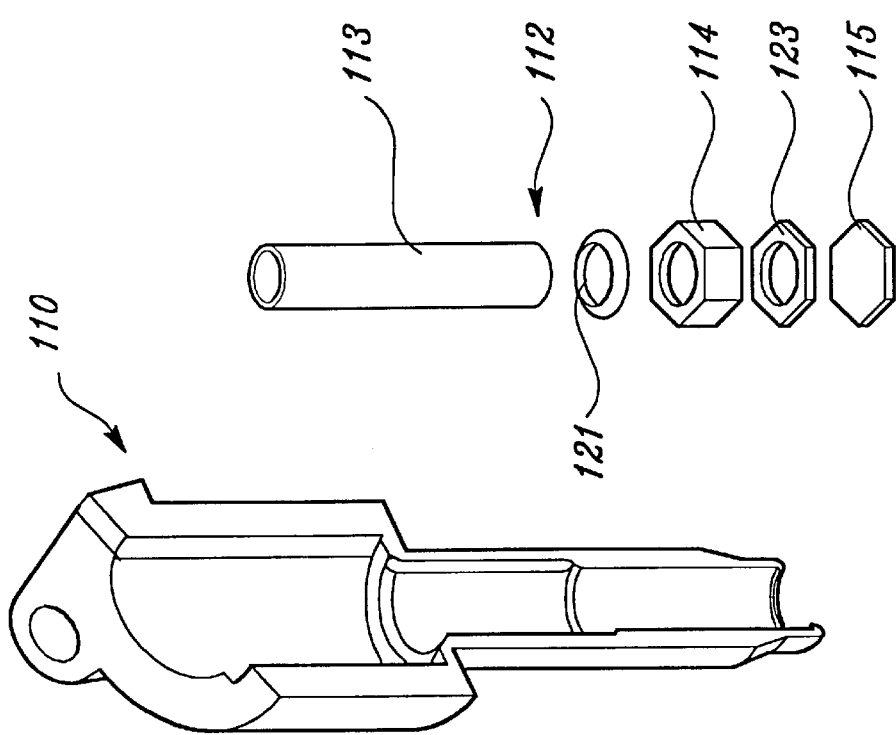
FIG. 3 shows a partial cross section perspective view of a probe head body and integral probe tip therefore, with an exploded view of the seal assembly in accordance with one embodiment of the present invention.

Referring now to FIG. 3, one embodiment of the present invention will be discussed. In this particular embodiment, an epoxy 121 is added to the stabilizer collar 114 in order to permanently affix collar 114 to the distal end of tube 113 so as to better secure the collar 114 thereto. In the past, the stabilizer collar 114 could be shaken loose from its sealed position since collar 114 was merely snapped on the distal end of tube 113. Thus, if the probe head body 110 were dropped or otherwise jarred during use, the collar 114 could become displaced from its seated position and create a breach in seal 112.

In FIG. 4, the seal 112 of this particular embodiment is made by having epoxy 121 applied to juncture 122 where the stabilizer collar 114 and tube 113 meet, thereby creating a permanent bond that affixes the collar 114 to the distal end of tube 113. Further, a gasket 123 is placed between the collar 114 and the IR filter 115 in order to interpose a flexible and elastic barrier behind the IR filter 115. The gasket 123, preferably made of rubber or other suitable elastomeric material, serves to provide a watertight seal at the interface between the IR filter 115 and stabilizer collar 114 from fluid and debris which might otherwise work its way inside the interior of the probe head tip 111.

During manufacturing, seal 112 is formed by applying a predetermined compressive force A to the proximal end of tube 113 which forces stabilizer collar 114 against gasket 123 and permanently compresses the gasket 123 between the IR filter 115 and the stabilizer collar 114. In turn, the IR filter 115 is forced against and seated in the lip 116 of the probe head tip 111, thereby creating an improved seal 112 in which the gasket 123 seals the probe tip opening 120 and prevents foreign matter and fluids from entering into the optical path inside the probe head body 110. When compressed in the direction of force A, the gasket 123 expands in the plane perpendicular to force A, thereby creating a seal against the interior wall of the probe tip 111. A more detailed description of the method of manufacturing the various embodiments of seal 112 will be discussed in association with the preferred embodiment of the present invention.

Referring now to FIG. 5, another embodiment of the present invention will be discussed. In this particular embodiment, a groove 224 is formed on the outside surface of tube 213 in order permit tube 213 to engage the stabilizer collar 214 instead of using epoxy 121 to accomplish the same. An accompanying nib 225, located on the inside circumference of stabilizer collar 214, is formed to engage the groove 224. Preferably, nib 225 is snapped into place fully engaging the groove 224 and the distal end of stabilizer collar 214 is slightly offset with the distal end of tube 213. Once stabilizer collar 214 is affixed to tube 213, a gasket 223 is interposed between collar 214 and an IR filter 215, thereby completing seal 212.

Referring now to FIG. 6, the manufacture of seal 212 will be explained in greater detail. Seal 212 is built by first engaging nib 225 of stabilizer collar 214 to groove 224 until collar 214 is slightly offset with the distal end of tube 213. After stabilizer collar 214 is properly installed on tube 213, gasket 223 is interposed between collar 214 and IR filter 215. Gasket 223, preferably made of the same elastomeric material referred to in the previous embodiment, is pressed against IR filter 215 SO as to create a watertight barrier behind filter 215 and prevent fluid and debris from contaminating the optical pathway of tube 213 inside probe tip 211.

During manufacturing, seal 212 is formed in similar fashion as the embodiment of seal 112 wherein a predetermined compressive force A is applied to the proximal end of tube 213 which forces the seal 212 assembly against the probe lip 216. Force A compresses gasket 223 so that a watertight barrier is created behind IR filter 215. When compressed in the direction of force A, the gasket 223 expands in the plane perpendicular to force A, thereby creating a seal against interior wall of the probe tip 211. Once the seal 212 assembly is compressed into the probe head body 210, a coupling member (not shown) connected to a thermopile assembly (also not shown) is attached to the proximal end of tube 213, thereby completing the assembly and insertion of seal 212 into body 210.

Referring now to FIG. 7, a further embodiment of the present invention will be discussed. In this particular embodiment, seal 312 is designed to be housed inside a probe head body 310 with a removable probe tip 311. The seal 312 assembly comprises a tube 313 connected to stabilizer collar 314 at the distal end of tube 313 with collar 314 being slightly offset with the tube 313 thereto. Collar 314 is affixed to tube 313 in a similar fashion previously shown in FIGS. 3 and 4 with a ring of epoxy 321 permanently bonding collar 314 to tube 313. An anti-rotation collar 326 is also provided at the midpoint of tube 313 so as to prevent rotation of the tube 313 when the probe tip 311 is unscrewed from the probe head body 310, thereby avoiding recalibration of the thermometer due to the tube 313 being dislodged inside the body 310. A further detailed discussion of the anti-rotation collar 326 will be made below. As in previous embodiments of seal 312, a gasket 323 made of an elastomeric material is interposed between stabilizer collar 314 and IR filter 315 and functions as a sealing member against outside contaminants that might penetrate between the filter 315 and the tip opening 320.

Probe tip 311 has a frustoconical shape and is designed to be removable from the probe head body 310 so that tip 311 and IR filter 315 can be easily replaced in cases where the tip 311 becomes deformed or the filter 315 scratched due to careless or abusive handling by the user. Preferably, the probe tip 311 is comprised of titanium which provides a strong outer casing for the probe tip opening 320 and the part of seal 312 assembly housed in tip 311. However, any suitable material that has a low thermal conductivity and high strength is felt to fall within the spirit and scope of the present invention. The probe tip 311 includes a female connection means 329 formed on the interior circumference of tip 311 and located at the proximal end of tip 311 which attaches to a male connection means 330 located at the distal end of the probe head body 310. The male connection means 330 includes a plurality of alignment holes 355 formed around the circumference of the connection means 330. When the user is attaching the probe tip 311 to the probe head body 310, the user aligns a screw hole 354 formed near the proximal end of tip 311 to one of the plurality of alignment holes 355 of the probe head body 310 so that a set screw 339 can be placed therethrough. Once the set screw 339 is mounted into the aligned screw hole 354, a special tool (not shown) is used to screw the set screw 339 into the hole 354 until the screw 339 is firmly in place and the probe tip 311 is secured onto the probe head body 310.

In a preferred configuration of the removable probe tip 311, the female connection means 329 comprises a plurality of threads that attaches to male connection means 330 which comprises a screw member that screws onto the threads of the female connection means 329 in order to secure the tip 311 thereto. However, it is within the spirit of the present invention that any type of suitable connection means may be employed that securely attaches the probe tip 311 to the probe head body 310. Probe tip 311 includes a groove 331 along the inner surface of tip 311 which holds a sealing member 328 that creates a watertight seal against fluid and debris from entering the probe head body 310 through the connection means 329, 330. Preferably, the sealing member 328 is an O-ring seal which possesses sufficient elastomeric properties to properly seal off interface between the probe tip 311 and the probe head body 310 from outside contaminants. The probe tip 311 also includes a plurality of external channels 333 with each channel 333 extending from the proximal end of tip 311 to the tip's 311 midpoint where each channel 333 tapers out to the flat conical surface of tip 311. Each channel 333 serves to vent air that is captured inside a tight fitting probe tip cover (not shown) whenever the user snaps a new cover onto the probe tip 311 prior to use.

Referring to FIG. 8, a cross section of the probe tip 311 and seal 312 assembly are shown with the female connection means 329 fully attached to the male connection means 330. During manufacturing, a compressive force A is then applied to the proximal end of tube 313 which forcibly wedges gasket 323 between the stabilizer collar 314 and IR filter 315, thereby forming a watertight barrier thereto due to the permanent compression created by force A on the seal 312 assembly. When compressed in the direction of force A, gasket 323 expands in the plane perpendicular to force A, thereby creating a seal against the interior wall of the probe tip 311. Further, a sealing member 328 is placed inside groove 331 of tip 311 in order to prevent leakage through connection means 329, 330 when body 310 is attached to probe tip 311. The probe tip 311 is engaged to the probe head body 310 by screwing the female connection means 329 of probe tip 311 onto the male connection means 330 of the probe head body 310, thereby forming a firm and watertight connection between body 310 and tip 311 thereto. Also during manufacturing process, the anti-rotation collar 326 is affixed to the tube 313 by sliding the collar 326 to the midpoint of tube 313 by aligning a key 327 of the probe head body 310 to a slot 332 of collar 326.

Figure 10:
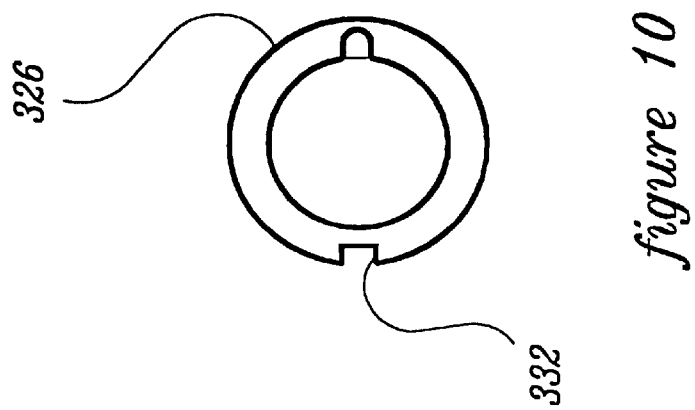
FIG. 10 shows a top view of the anti-rotation collar in accordance with any one embodiment of the present invention.
Figure 9:
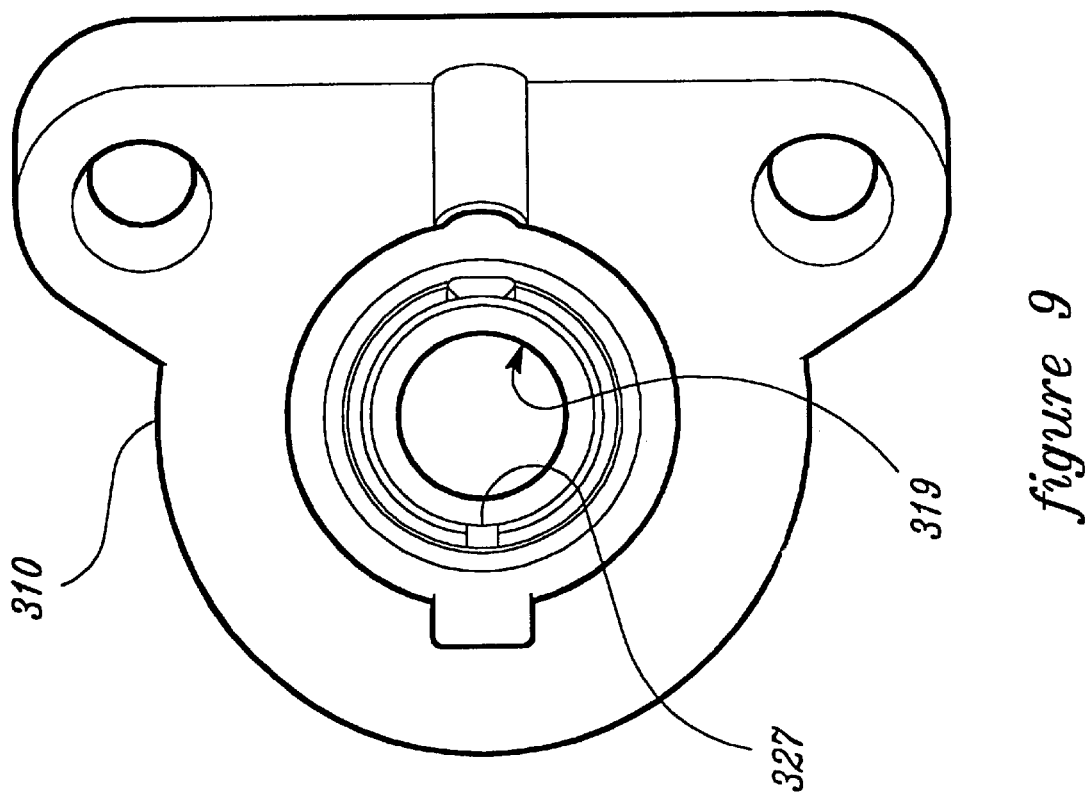
FIG. 9 shows an end view perspective of the probe head body in accordance and one embodiment of the present invention.

Referring to FIGS. 9 and 10, a more detailed explanation of the anti-rotation collar 326 will be discussed. The anti-rotation collar 326 serves as a means for preventing rotation of the tube 311 whenever technicians servicing the tympanic thermometer are unscrewing the probe tip 311 to gain access inside the thermometer. Due to the tight fit of the seal 312 to the probe tip 311, rotation of the tip 311 during removal can concurrently rotate the tube 313 and bring the thermometer out of calibration. In order to prevent rotation, the tube 313 is fit with an anti-rotation collar 326 that affixes the tube 313 in place by attaching the tube 313 to the probe head body 310 through the collar 326. The probe head body 310 includes a keyway 327 that comprises a long narrow body that extends from the proximal end of the second bore 319 to a midway point through bore 319. The keyway 327 serves as an accompanying guide and securing member for slot 332 on the anti-rotation collar 326 so that the collar 326 cannot rotate inside the second bore 319 of the probe head body 310. During manufacturing, the anti-rotation collar 326 is placed around the midpoint of tube 313 where the collar 326 is soldered in place, thereby permanently affixing the collar 326 to the tube 313. The anti-rotation collar 326 and tube 313 assembly is then slid into the proximal end of the probe head body 310, thus aligning the slot 332 of the collar 326 with the keyway 327 of the probe head body 326.

Referring to FIG. 11, one embodiment of seal 412 used in conjunction with the probe tip 411 will be explained. Probe tip 411 is a removable tip which connects to probe head body 410 by a female connection means 429 located on the inner circumference of tip 411 at its proximal end. The probe head body 410 has a male connection means 430 at its distal end that connects to the female connection means 429. Preferably, Female connection means 429 is comprised of a threaded member and the male connection means 430 is comprised of a screw member wherein the screw member of connection means 429 is designed to screw onto the threaded member of connection means 430. However, any suitable connection means that permits a tight and secure attachment of the probe tip 411 to the distal end of probe head body 410 is felt to fall within the spirit and scope of the present invention.

An alternative embodiment of seal 412 comprises a tube 413, an anti-rotation collar 426, a sleeve 431 and an IR filter 415. Preferably, sleeve 431 is made of either a natural or synthetic elastomer or a polymer designed to form fit around the distal end of tube 413. The sleeve 431 functions in the same manner as gasket 123 in the previous embodiments by functioning as an elastic barrier that presses against IR filter 415 and seals off the distal end of probe tip 411 from debris and other contaminants that might enter between the lip 416 and IR filter 415. The sleeve 431 also seals the interface between the probe tip 411 and the probe head body 410 from fluids and debris. Finally, the anti-rotation collar 426 functions in the same manner as described above in the previous embodiment.

Referring to FIG. 12, a cross section of the probe tip 411 is shown to demonstrate the method of manufacturing the seal 412 of the present invention. During assembly, a predetermined force B is generated in the sleeve 431 parallel to the sleeve 431 axis. The compressive force B is generated in the sleeve 431 when the probe tip 411 is screwed on or otherwise attached onto the probe head body 419. During this compressive state, the probe tip lip 416 draws the IR filter 415 against the sleeve 431 which compresses the sleeve 431 against the probe head body 410. The compression of sleeve 431 against the infrared filter 415 then seals the interface between the probe tip 411 and the probe head body 410, thereby creating a watertight seal thereto.

Figure 13:
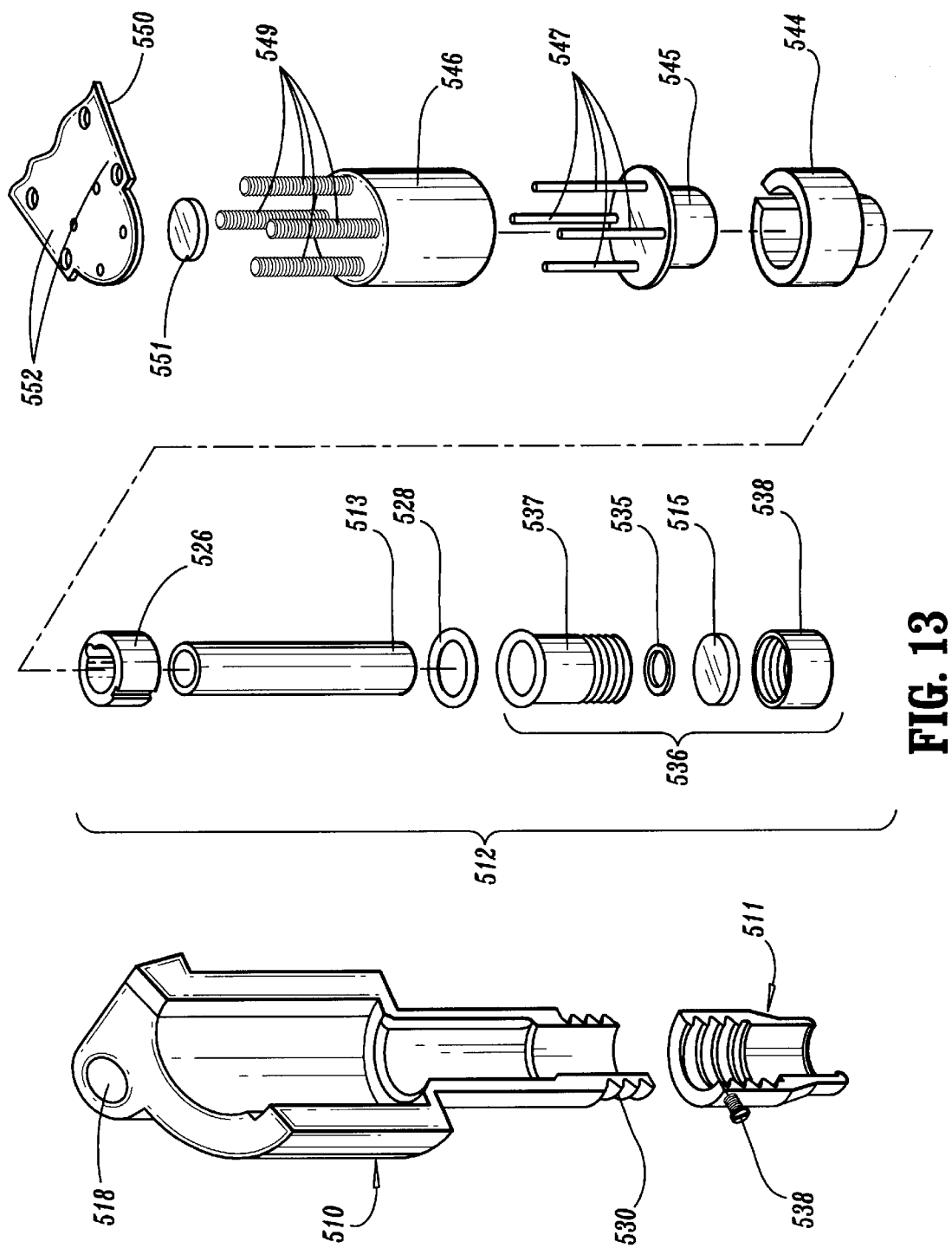
FIG. 13 shows a partial cross section perspective view of the probe head body with removable probe tip with an exploded view of the seal in accordance with the fifth embodiment of the present invention which is the presently preferred embodiment of the invention.

Referring to FIG. 13, the preferred embodiment of a watertight seal 512 and the associated method of manufacturing seal 512 will be discussed. In the preferred embodiment, the seal 512 assembly comprises an anti-rotational collar 526, a tube 513, a sealing member 528 for the probe tip 511 and a filter holder assembly 536. The filter holder assembly 536 includes a holding member 537, a filter sealing member 535, an IR filter 515 and a screw-on member 538.

Figure 15:
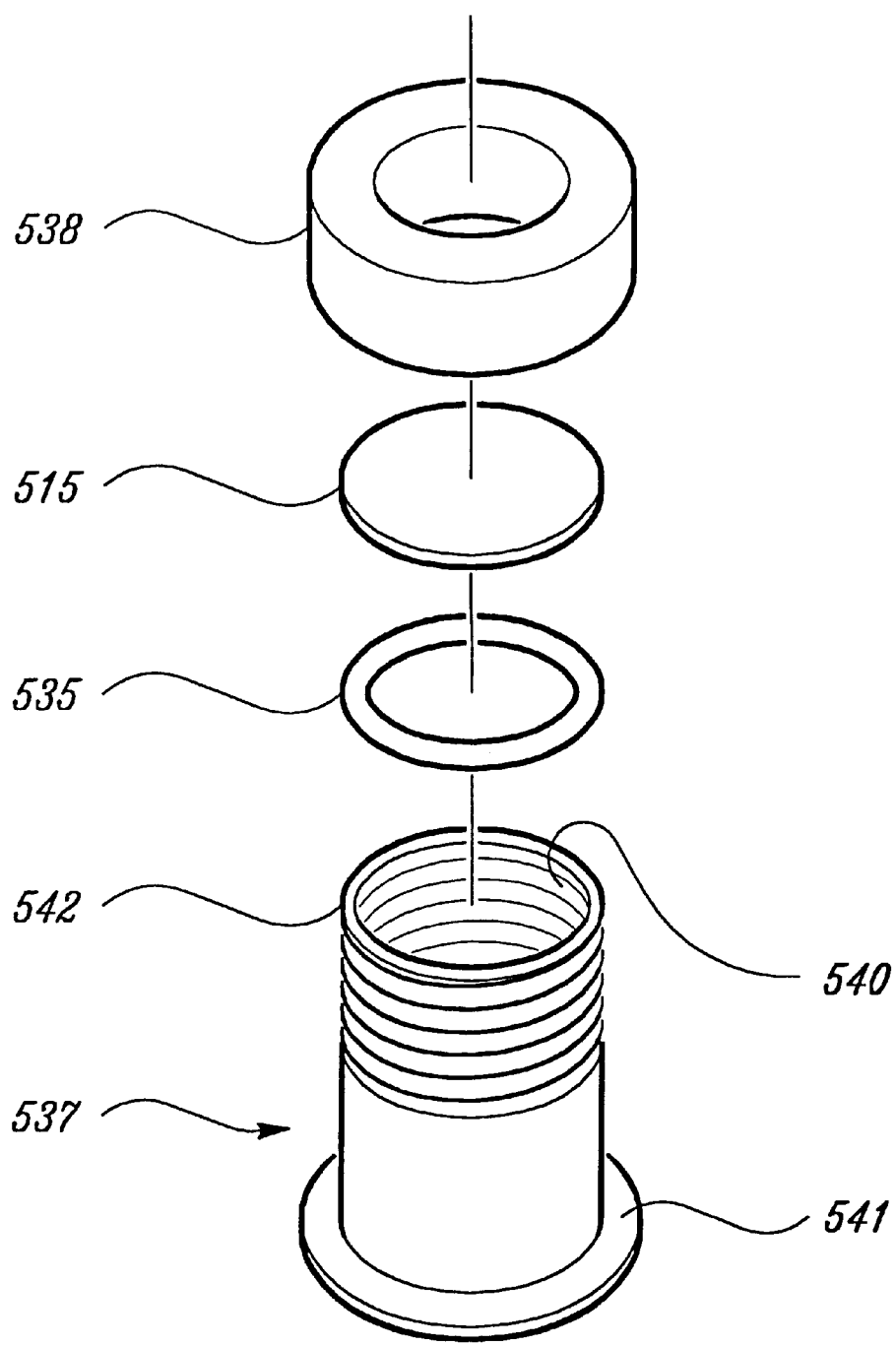
FIG. 15 shows an exploded view of the filter holder in accordance with the preferred embodiment of the present invention.

FIG. 15 is a detailed perspective showing an exploded view of the filter holder assembly 536. IR filter 515, which is held securely in place by the filter holder assembly 536, is preferably made of Germanium with a hard carbon anti-reflective coating. However, the filter may be made from any suitable material that exhibits a high transmissivity in the infrared range. The holding member 537 has a cylindrical shape with an outer flange 541 that is flush with the proximal end of member 537 and a threaded portion 542 at the distal end of member 537. The holding member 537 further includes an inner flange 540 located on the inside surface of member 537 for seating the IR filter 515 so that the filter 515 and filter sealing member 535 are approximately flush to the distal end of member 537. During assembly, the filter sealing member 535, preferably a conventional O-ring, is placed on the inner flange 540 with the IR filter 515 placed on top of the member 535. The filter sealing member 535 serves as an elastic barrier which seals off the area behind the IR filter 515. Once the filter sealing member 535 and the IR filter 515 are properly seated inside the holding member 537, the screw-on member 538, which has matching threads on the interior surface, is screwed onto the threaded portion 542 of the holding member 537 and the filter holder assembly 536 is competed.

Figure 14:
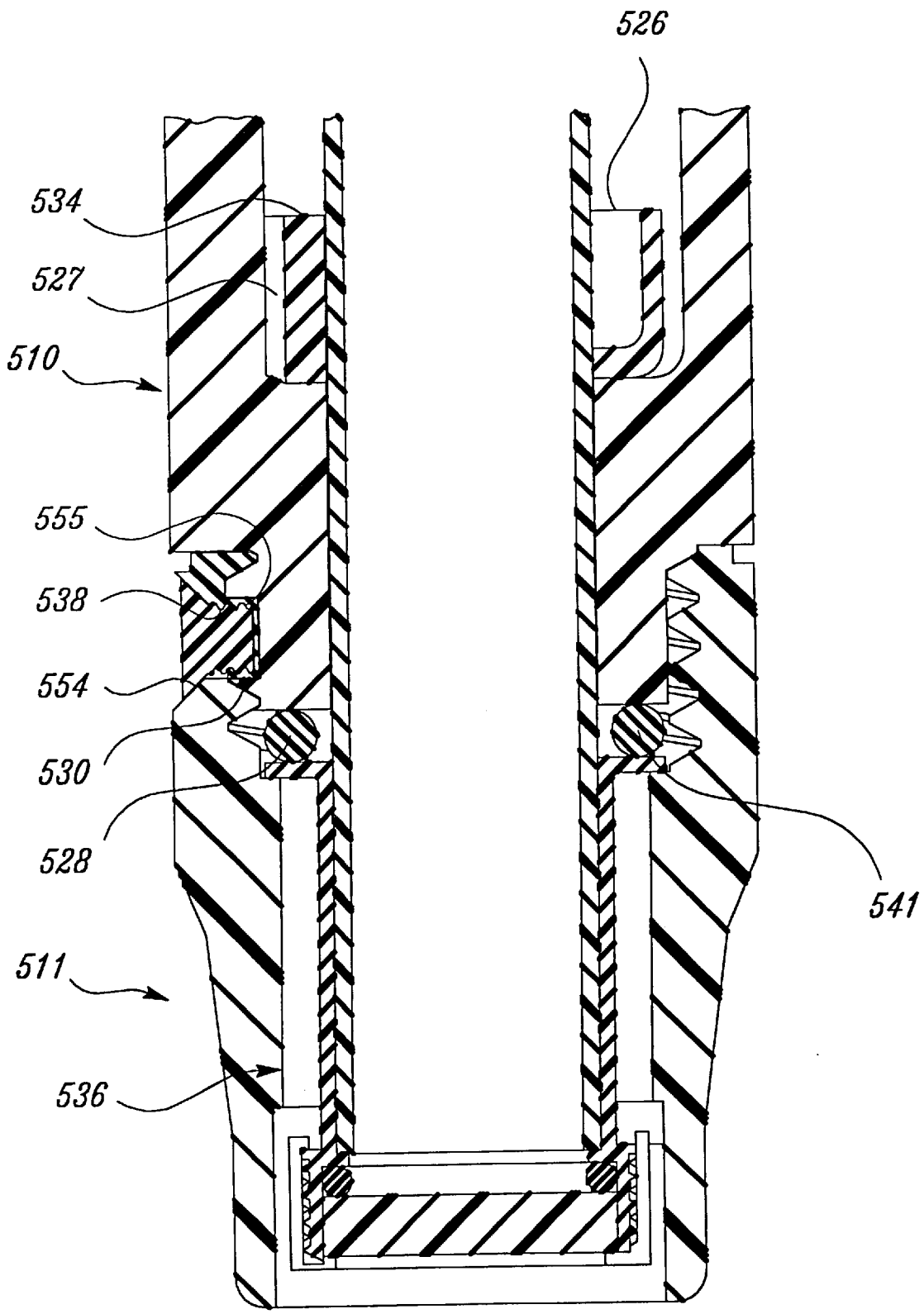
FIG. 14 shows a cross section of the removable probe tip and seal assembly in accordance with the preferred embodiment of the present invention.

Referring back to FIG. 13, the method of manufacturing the preferred embodiment of present invention will be discussed. The assembly of the seal 512 comprises first attaching the anti-rotation collar 531 to tube 513 in the same manner as described above. FIG. 14 shows the anti-rotation collar 526 affixed to the probe head body 510 using the slot 532 of collar 526 to the key 527 of body 510 and around the tube 513. After the anti-rotation collar 526 is engaged, the filter holder assembly 536 is connected to the distal end of tube 513 until the outer flange 541 of the holding member 537 abuts the sealing member 528 which is itself seated against the male connection means 530 of the probe head body 510. Once the filter holder assembly 536 is engaged, a retainer 544, which houses a thermopile 545, is attached to the proximal end of tube 513. A plug 546 having a plurality of holes has thermopile leads 547 inserted through the distal end of plug 546 through one of the holes with each respective lead 547 being soldered to the distal end of one of the three respective compression springs 549 which are inserted through the proximal end of plug 546. Finally, the proximal end of each compression spring 549 is soldered to the thermometer's circuit board 550. Once the compression springs 549 are soldered at both ends, an elastic compression spacer 551 is interposed between the plug 549 and the circuit board 550. The mounting holes 518 of the probe head body 510 are then aligned with openings 552 and screws (not shown) are inserted therethrough. As the screws are tightened, a predetermined compressive force is exerted by the screws which brings the circuit board 550 in tight contact with the probe head body 510 and compresses both the compression springs 549 and the compression spacer 551. The compression generated by the compression springs 549 and the compression spacer 551 serves to maintain the compressive tension within the seal 512 due to the constant pressure exerted by springs 549 and spacer 551 against the circuit board 550 and the probe head body 510.

Referring to FIG. 14, once the probe head body 510 has been securely attached to the circuit board 550, the removable probe tip 511 is screwed onto the male connection means 530 of the body 510 until the screw hole 554 is aligned with one of a plurality of alignment holes 555 set into the male connection means 530. After the screw hole 554 is properly aligned with one of the alignment holes 555, the set screw 538 is screwed into opening 554 until the probe tip 511 is securely attached to the probe head body 510. As the probe tip 511 is being attached, the outer flange 541 of the filter holder assembly 536 is gradually forced against the sealing member 528 which is interposed between the threaded portion 530 of the probe head body 510 and the flange 541, thereby creating a watertight barrier that prevents leakage through the interface between the probe tip 511 and the probe head body 510.

Although particular embodiments of the invention have been shown, it is not intended that the invention be limited thereby, instead the scope of the present invention is intended to be limited by the appended claims.

What is claimed is:

1. A method of forming a fluid seal inside an optical probe, comprising the steps of:
   providing the optical probe which includes:
      a probe body having a first bore and a second bore, the first bore being in communication with said second bore, said first bore having a proximal end attached to a thermometer, said second bore having a proximal end attached to said first bore and a distal end having an opening;
   providing a seal assembly including a tube, a collar being attached to the tube, a filter and a first sealing member being interposed between said collar and said filter;
   positioning said seal assembly within at least a portion of said second bore of said probe body such that said filter of said seal assembly is interposed between said first sealing member and said opening; and
   applying a predetermined compressive force to said tube such that said seal assembly forms at least one fluid tight interface configured to prevent fluid introduction through said opening of said probe body.

2. The method according to claim 1, wherein said collar is attached to said tube using epoxy.

3. The method according to claim 1, wherein the first sealing member is a gasket.

4. The method according to claim 1, wherein the filter is an infrared filter.

5. A method of forming a fluid seal inside an optical probe, comprising the steps of:
   providing the optical probe which includes:
      a probe body having a bore, said bore including a distal portion having an opening;
   providing a seal assembly including a tube, a collar being attached to the tube a filter and a first sealing member being interposed between said collar and said filter;
   positioning said seal assembly within at least a portion of said bore such that said filter is interposed between said first sealing member and said opening; and
   applying a predetermined compressive force to said tube such that said seal assembly forms at least one fluid tight interface configured to prevent fluid introduction through said opening of said probe body.

6. A method as recited in claim 5, wherein the step of applying includes said first sealing member forming a first fluid tight interface with said bore of said probe body and said filter forming a second fluid tight interface said bore.

7. A method as recited in claim 5, wherein the step of providing a seal assembly further includes said tube having a groove formed on an outer surface thereof and said collar having a nib formed on an inner circumference thereof, whereby said nib engages said groove to facilitate attaching said tube to said collar.

8. A method as recited in claim 5, further including the step of mounting an anti-rotation collar to said tube such that said anti-rotation collar is disposed within said bore of said probe body to prevent rotation of said seal assembly.

9. A method as recited in claim 6, wherein the step of providing a seal assembly further includes a second sealing member being proximally disposed relative to said first sealing member within said bore such that the step of applying includes said second sealing member forming a third fluid tight interface with said bore.

10. A method as recited in claim 5, including the step of providing a filter holder assembly disposed within at least a portion of said bore and being configured to engage and secure said filter with the optical probe.

11. A method as recited in claim 10, wherein the step of providing said filter holding assembly includes a filter sealing member being positioned between said filter and said filter holding assembly, wherein the step of applying includes said filter sealing member forming a first fluid tight interface with said filter and said filter holding assembly, said filter holding assembly forming a second fluid tight interface with said bore and said filter holding assembly forming a third fluid tight interface adjacent said opening.

12. A method as recited in claim 5, including a step of providing compression springs, wherein the step of applying the predetermined compressive force includes translating a compressive force from said compression springs to said seal assembly.

13. A method as recited in claim 5, further including the step of mounting a thermometer with a proximal portion of the bore.

14. A method as recited in claim 5, wherein the step of applying includes applying said predetermined compressive force to said tube such that said seal assembly is configured to form a thermally, optically and mechanically sensitive fluid tight interface at the distal portion of said bore.

* * * * *